F. B. KINNEY.
TOOL INDICATOR.
APPLICATION FILED MAY 25, 1915.

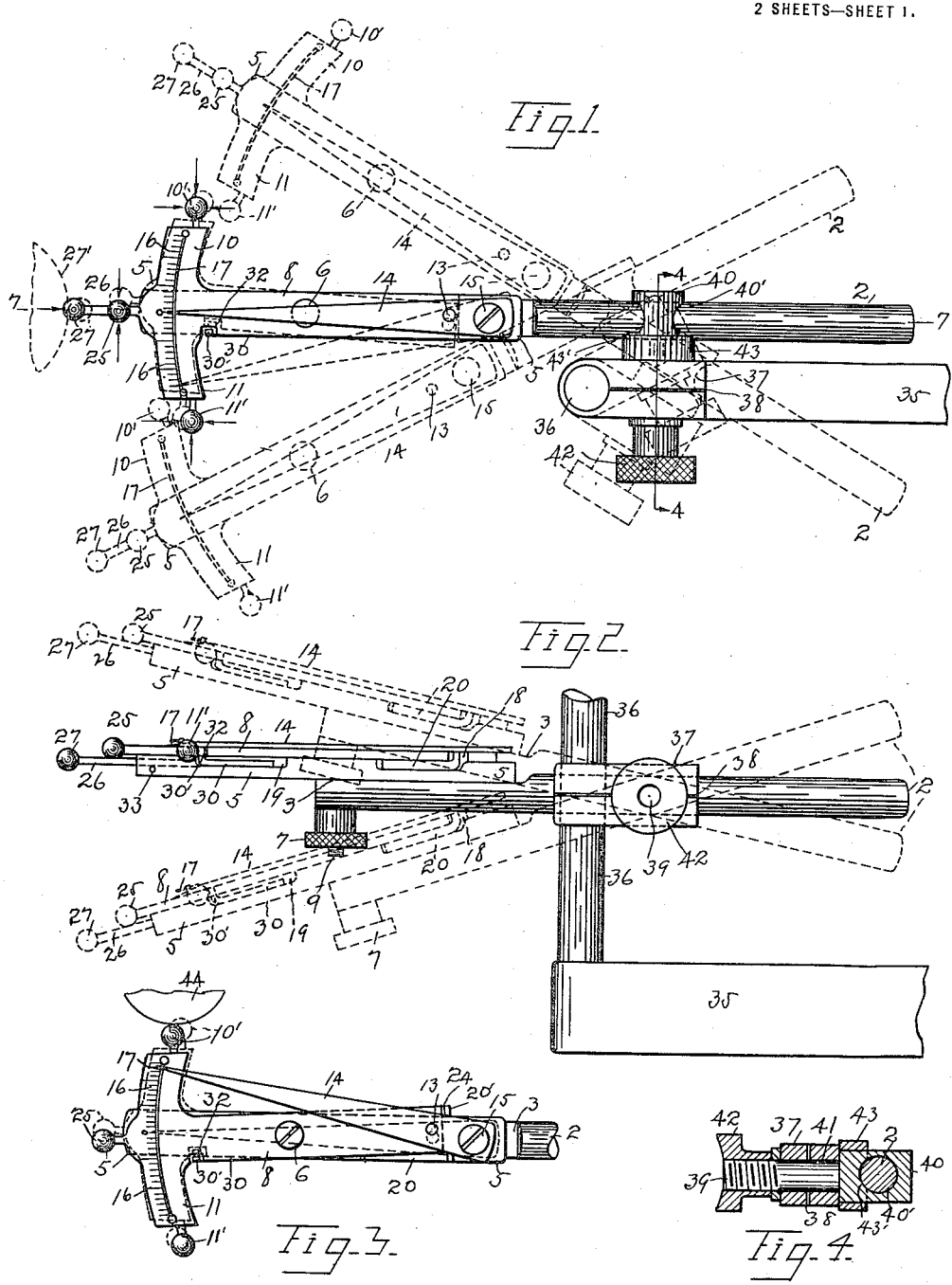

1,186,911.

Patented June 13, 1916.
2 SHEETS—SHEET 2.

WITNESS
Walter L. Fey

INVENTOR.
FRANK B. KINNEY
BY Harry De Wallace
ATTORNEY.

UNITED STATES PATENT OFFICE.

FRANK B. KINNEY, OF SYRACUSE, NEW YORK.

TOOL-INDICATOR.

1,186,911.　　　　Specification of Letters Patent.　　Patented June 13, 1916.

Application filed May 25, 1915. Serial No. 30,443.

*To all whom it may concern:*

Be it known that I, FRANK B. KINNEY, a citizen of the United States, residing at Syracuse, in the county of Onondaga and State of New York, have invented certain new and useful Improvements in Tool-Indicators, of which the following is a specification.

This invention relates to improvements in tool indicators, and has for its object to provide a novel, simple, convenient and universal indicator, for use by machinists, inspectors, and others, for "truing" or "lining" up various kinds of machine work.

A further object is to provide a device or work-indicator, which may be used manually or may be attached to and used in connection with lathes, milling-machines, or planers, and which is adapted for gaging, indicating, truing or lining up round or plane surfaces, and either external or internal surfaces. And a further object is to provide means for adjusting and setting the said device in any position relatively to the work, as well as to provide a plurality of bearing or contact points, all of which coöperate with a common indicator member or pointer and a scale, for indicating the condition of the work.

The various features and parts of the invention will be understood from the detailed description which follows, and by reference to the accompanying drawings, in which—

Figure 5:
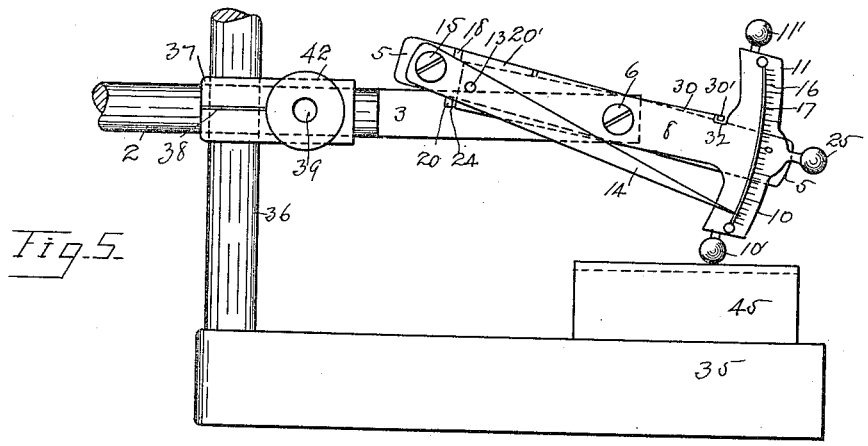
Figure 6:
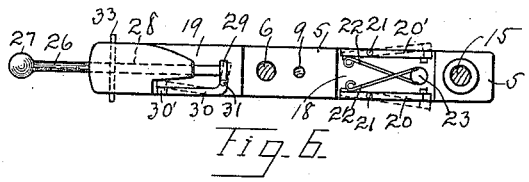
Figure 7:
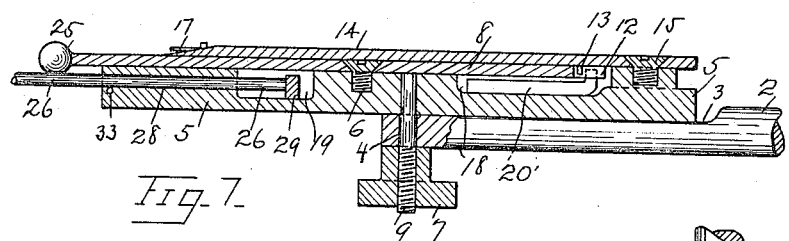
Figure 8:
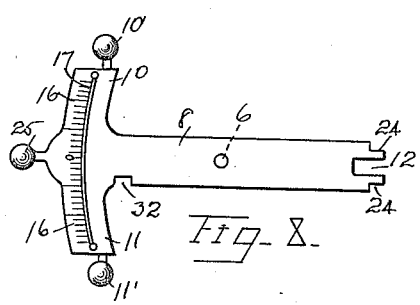
Figure 9:
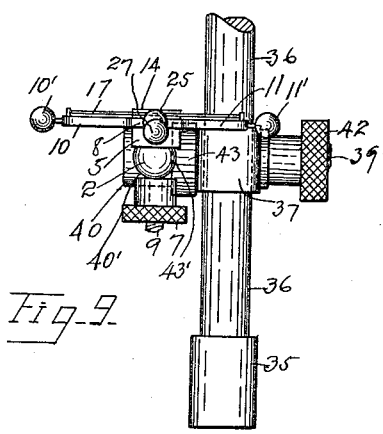

Figure 1 is a top-plan view of the complete device, showing the same pivotally mounted upon a supporting-bracket; also showing by full and dotted lines certain position to which the indicator may be adjusted horizontally on the bracket. Fig. 2 is a side elevation of the same; showing by full and dotted lines different positions to which the indicator may be adjusted vertically. Fig. 3 is a view of the indicator detached from the supporting-bracket; showing the needle deflected in one direction for indicating a fault in certain work. Fig. 4 is a sectional detail, taken on line 4—4 of Fig. 1. Fig. 5 is an elevational view; showing the indicator employed for truing up plane surfaces. Fig. 6 is a top-plan view of the base which supports the indicator-plate and needle. Fig. 7 is a central longitudinal section, taken on line 7—7 as Fig. 1. Fig. 8 is a plan view of the indicator-plate. Fig. 9 is a front-end elevation of the device shown in Fig. 1.

In the drawings, 2 indicates a round rod or stock, one portion of which is cut away, for providing a flat bearing surface 3, the free end thereof having a perforation 4.

The indicator proper comprises a number of parts movable as one, and adjustably mounted upon the flat surface 3 of the stock; 5 represents an elongated base, preferably rectangular in form, and made of steel, or other suitable metal, to the center of which is rigidly secured a screw 9, which passes loosely through the perforation 4 of the stock 2, and serves as the pivot upon which the base may be rotated during adjustment. The free-end of the screw 9 which extends beyond the stock 2 is fitted with a thumb-nut 7, by means of which the indicator parts are held rigidly in any position relatively to the stock after each adjustment.

8, Fig. 8, represents an anchor-shaped plate which is pivotally mounted upon the top-face of the base 5, by means of a screw 6, which pierces the center of said plate and is threaded into the said base. The head of the plate 8 consists of opposite laterally extending arms 10 and 11, to the free ends of which are secured bearing points or knobs 10' and 11', which are brought into contact with the work when certain indications are desired. The opposite end of plate 8 has a slot 12, which is engaged by a pin 13 projecting from the under side of the indicator-needle 14. The needle 14 is pivoted by a screw 15 to the inner end of the base 5; the said screw passing loosely through the heel of the needle and threading into the base 5.

The head of the plate 8 is provided with a scale 16, preferably intended to represent thousandths of an inch, which are read in opposite directions from the center, or zero. In practice, the calibrations 16 each side of "0" represent about 75/1000 of an inch. For clearness, however, the drawings show one graduation for every 5/1000. The point of the needle 14 when at rest points to "0", as shown by the full and dotted lines in Figs. 1, 3.

17 represents an arc-shaped wire guard, which is mounted upon the head of the plate 8, beneath which the point of the needle plays.

The base 5 has its top surface cut-away or recessed at 18 and 19, Figs. 6 and 7, on either side of the pivot screws 6 and 9.

20 and 20' represent similar levers or dogs which are pivotally disposed in the recess 18 by pins 21. The dogs 20 and 20' are spaced apart, and between them is disposed a U-shaped spring 22, which is secured to the base 5 by a pin 23, while the free ends of the spring bear respectively against the forward ends of the dogs 20 and 20', and exert their tension for normally holding the said dogs parallel to each other. The opposite ends of the dogs 20 and 20' are bent upwardly and engage notches 24 in the end of plate 8, at the opposite sides of the slot 12 (see Figs. 2 and 8). By the provision of the dogs 20 and 20' and the spring 22, the plate 8 is normally held in the position shown in full lines in Fig. 1, which is the rest position, and when the said plate is so held, the needle points to "0" on the scale 16. When pressure is exerted against either of the bearing knobs 10' and 11' in the direction indicated by the arrows in Fig. 1, the bent-ends of the corresponding dogs are swung outwardly by the plate 8, and at the same time the said plate, by reason of the engagement of the pin 13 with the slot 12, swings the point of the needle toward the object which the said bearing knobs engage. After the indicator is disengaged from the object or work, the spring 22 shifts the operated dog back to the normal position (see Fig. 1) and the latter, owing to its engagement with the notch 24 then restores both the plate 8 and the needle 14 to their central or rest position.

25 represents a third bearing knob, which is mounted upon the head of plate 8 in line with the longitudinal center thereof, and is used instead of the other knobs under certain conditions, for more conveniently obtaining an indication. The arrows in Fig. 1, indicate the directions from which pressure may be applied to the knob 25 for actuating the indicator needle.

It is sometimes necessary for the mechanic to obtain an indication of certain work, wherein it would be impossible or inconvenient to employ either of the knobs 10', 11' or 25. For this purpose, I provide a fourth bearing point, which consists of a push-rod 26, the outer end of which is fitted with a ball or bearing knob 27. The rod 26 is reciprocatably disposed in a longitudinal perforation 28, which extends from the forward end of the base 5 rearwardly and communicates with the recess 19. The rod extends across the said recess, and its inner end engages an arm 29, arranged on one end of a lever or dog 30, which is pivoted in said recess by a pin 31. The opposite end 30' of the lever 30 is bent upwardly and engages a notch 32 in one edge of the plate 8 (see Figs. 1, 2, 3 and 5). By the operator pressing the ball 27 against an object, as 27', the rod 26 is forced inwardly and rocks the dog 30 in the direction for moving the head of plate 8 to the right, and the said plate at the same time, through the pin 13 and slot 12, swings the pointer to the left, for indicating how much the work is "out of true," (as best seen by the dotted lines in Fig. 1). The bearing point 27 is only effective when the pressure is applied longitudinally. The push-rod 26 is held in place by a pin 33, which passes through the base 5 at right-angles to the rod. The pin and the rod both being cut-away in a well-known manner for allowing the insertion, removal, and locking of the said parts.

For certain kinds of lathe and screw-machine work, additional holders or supports for the indicator are required. These supports may partake of many forms, but I prefer to employ the device illustrated in the drawings, which consists of a base 35, comprising a plain bar of steel, which may be chucked in the tool or slide rest of any lathe, and an upright post, preferably a round rod 36, which is rigidly embedded in one end of the base 35.

37 represents a clamp, one end of which is bored out to receive and freely slide on the post 36, the said clamp being split as at 38, and 39 represents a bolt having a head 40 at one end and threads at the other end. The said bolt passes loosely through a transverse perforation 41 in the clamp. A thumb-nut 42 is then applied to the threaded end of one bolt, and when tightened up, causes the clamp to tightly grip the post 36. The head 40 of the bolt 39 has a transverse perforation 40' to receive the cylindrical portion of the stock 2, and 43 represents a collar-like washer which is interposed between the stock and the clamp 37, one side of the said collar being hollowed-out at 43' to form a seat for the stock.

When it is undesirable or inconvenient to use the support 35—36, the stock 2 and the indicator may be disconnected from the bolt 39, and the stock may be chucked in a tool rest or holder, or simply held in the hand, for obtaining the proper indication of any work. Fig. 3 illustrates the indicator detached from the support, and the knob 10' is brought into contact with a cylindrical object 44, the said object being "out of true" to the extent indicated by the deflection of the pointer 14 from "0".

Fig. 5 illustrates the indicator in connection with the support 35—36, wherein the bearing knob 10' is in engagement with one of the plane surfaces of a block 45, which represents a certain kind of work to be "trued up". In this view the indicator proper is set at an angle to the stock 2, for showing that the indicator may be swung around on the pivot 6 and set in any position relatively to the said stock.

It will be understood by reference to Figs. 1, 2 and 5, that when the indicator is mounted upon the support 35—36, the said device may be adjusted and set in any desired position relatively to the said support, for indicating and "truing-up" practically every kind of work where such an indicator is needed. In other words, my indicator is readily and quickly adaptable for universal adjustment and use.

It is obvious that the bearing knobs or points 10' 11' 25 and 27, may be inserted into a tube or other hollow piece or work, and brought into contact with the different surfaces thereof, for truing or lining up the work, and that some changes or modifications may be made in the parts of the device, within the scope defined by the appended claims, without departing from the spirit of my invention.

Having thus described my invention, what I claim as new and desire to secure by Letters Patent, is—

1. An indicator, comprising a stock, a base rotatably supported by said stock, means for holding said base in different positions relatively to the said stock, a plate pivoted to said base having at one end a plurality of spaced bearing points and a scale, an oscillatable needle over-lying said plate, and means for operatively connecting the opposite end of said plate with the said needle.

2. An indicator, comprising a stock, a base rotatably supported by said stock, a plate pivotally mounted upon said base, one end of said plate having a plurality of bearing knobs, the other end having a slot, a needle pivoted to said base and having a depending part engaging the slot of said plate whereby the point of the needle is moved in opposite directions by the oscillation of said plate.

3. In a tool indicator, an elongated base, an indicator plate over-lying and pivoted to said base, one end of said plate having a plurality of bearing points pointing in opposite directions, a needle pivoted near the opposite end of said plate, the point of said needle playing between said bearing points, means carried by said needle and engaged by said plate for oscillating the said needle, and spring-controlled means carried by said base for normally holding said needle and said plate in the rest position.

4. In a tool indicator, a stock having a bearing surface, a movable base pivoted to the stock and resting on said bearing surface, a plate pivotally mounted upon said base, one end of said plate having a scale and a plurality of bearing knobs, the other end of said plate having a slot, and a needle pivoted to said base and having a pin engaging the said slot whereby the rocking of said plate deflects the point of the needle in opposite directions.

5. In a tool indicator, an elongated base, an indicator plate over-lying and pivoted to the said base, one end of said plate having opposite laterally extending arms the free ends of which are tipped with bearing knobs, and a scale extending between the said knobs, the opposite end of said plate being slotted, and a needle, said needle supporting a pin disposed in the slot of said plate for actuating said needle, the heel of said needle pivoted near the slotted end of said plate, and the point of said needle arranged to sweep the said scale in opposite directions when actuated by the said plate.

6. In a tool indicator, an elongated base having a plurality of recesses in one side, an indicator plate pivotally mounted upon said base facing the said recesses, one end of said plate having opposite laterally extending arms provided with bearing knobs and a scale interposed between the said knobs, the opposite end of said plate being slotted, a needle pivoted to the base adjacent the slotted end of said plate and having a pin disposed in the slot of the plate for actuating the needle, and a plurality of spring-controlled dogs pivoted in said recesses adapted for controlling the movements of said plate.

7. An indicator including a stock for attachment to a support, a base rotatably mounted upon one end of said stock, said base having a plurality of recesses, a plate pivoted to the recessed side of said base having at one end a plurality of bearing points and a scale, a needle pivoted to the base and over-lying the said plate, a pin for operatively connecting said plate and said needle, and a pair of spring-controlled dogs disposed in one of said recesses and engaging notches in the opposite end of said plate for normally holding said needle at zero in the said scale, said dogs engaged by said plate and adapted to yield when said plate is rotated for permitting the needle to be moved from the zero position.

8. In a tool indicator, a stock adapted for attachment to a support, a base rotatably mounted upon one end of said stock, said base having a plurality of recesses, a plate pivoted to the recessed side of said base having at one end a plurality of bearing points and a scale adjacent the said points, the opposite end of said plate having a plurality of notches, a pair of dogs disposed in one of said recesses and engaging certain of said notches for normally holding said plate in the rest position, said dogs adapted to yield for allowing said plate to be moved from said position, a dog disposed in the other recess adapted when actuated to move said plate in one direction, and a needle pivoted to said base, the free end of said needle adapted to traverse the said scale, the said needle having a depending part engaging one of the notches in said plate whereby the said needle is actuated by movements of said plate.

In testimony whereof I affix my signature.

FRANK B. KINNEY.